Figure 1:
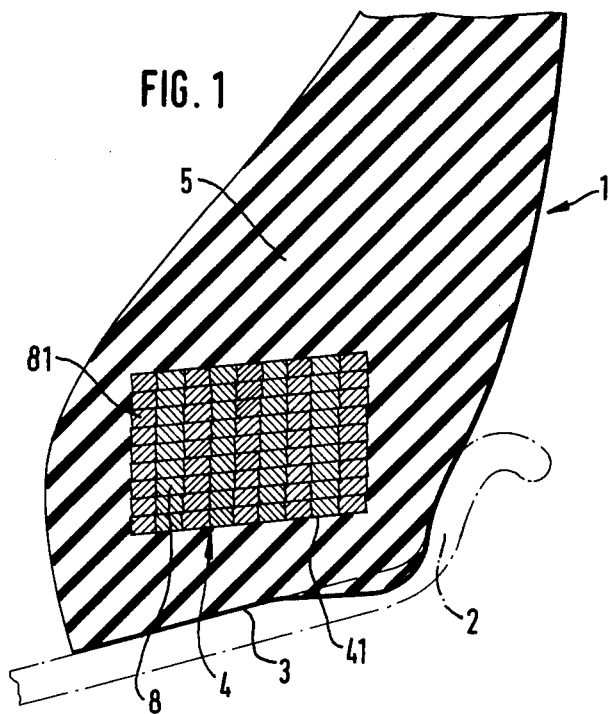

United States Patent [19]

Pfeiffer

[11] 4,166,492
[45] Sep. 4, 1979

[54] METHOD OF PRODUCING AN ANNULAR BEAD CORE ASSEMBLY FOR A PNEUMATIC TIRE

[75] Inventor: Herbert Pfeiffer, Hemer-Westig, Fed. Rep. of Germany

[73] Assignee: Otto Kuhlmann GmbH & Co., Hemer-Westig, Fed. Rep. of Germany

[21] Appl. No.: 854,094

[22] Filed: Nov. 23, 1977

[30] Foreign Application Priority Data

Nov. 25, 1976 [DE] Fed. Rep. of Germany ....... 2653553

[51] Int. Cl.$^2$ ............................................. B29H 17/32
[52] U.S. Cl. .................................. 152/362 R; 140/88; 156/136; 245/1.5
[58] Field of Search ............... 156/131, 132, 135, 136; 152/362 R, DIG. 9; 140/88; 245/1.5

[56] References Cited

U.S. PATENT DOCUMENTS

| | | | |
|---|---|---|---|
| 1,503,985 | 8/1924 | Corson | 152/362 R |
| 1,981,893 | 11/1934 | Abbott | 152/362 R |
| 2,149,079 | 2/1939 | White et al. | 245/1.5 |
| 3,057,566 | 10/1962 | Braden | 140/88 |
| 3,080,127 | 3/1963 | Porter | 140/88 |
| 3,330,491 | 7/1967 | Williams | 140/88 |
| 3,801,028 | 4/1974 | LaBoda | 152/362 R |
| 3,949,800 | 4/1976 | Lejeune | 156/136 |

*Primary Examiner*—John E. Kittle
*Attorney, Agent, or Firm*—Allison C. Collard; Thomas M. Galgano

[57] ABSTRACT

A method of producing an annular bead core assembly for a pneumatic tire from a plurality of wires of substantially rectangular cross-section, wherein the wires are formed into a plurality of plies. The wires of each wire ply then are arcuately deformed in a direction substantially perpendicular to the desired plane of the annular assembly when made but in a direction which will be towards the inner side of the tire when completed, each arcuate deformation yielding an arc having a constant radius. The arcuately deformed wire plies thereafter are wound on a tapered support to form the assembly.

2 Claims, 4 Drawing Figures

U.S. Patent    Sep. 4, 1979    4,166,492

METHOD OF PRODUCING AN ANNULAR BEAD CORE ASSEMBLY FOR A PNEUMATIC TIRE

The present invention relates to a method of producing an annular bead core assembly for a pneumatic tire. The core assembly has a cross-section which is substantially in the form of a parallelogram. The radially inner surface of the bead core is inclined so as to extend parallel with the seating surface of the bead on the rim, the inclination being relative to the axial direction of the pneumatic tire. Wires of rectangular cross-section are laid so as to be closely juxtaposed to form wire plies, and these plies are then repeatedly wound on a conical support, the angle of which corresponds to the slope of the shoulder of the rim closely one above the other to form the core assembly.

The bead region of a pneumatic tire is employed to seal the tire onto the rim and to absorb or transmit the complex transverse and longitudinal forces occurring during utilization of the tire.

It is known to produce annular core assemblies from closely juxtaposed wire plies formed of wires having a rectangular cross-section. These plies are tightly wound, one upon the other, on a conical support having a slope corresponding to that of the shoulder of the rim to form core assemblies. For pneumatic tires for fitting onto particular types of rims, annular core assemblies having a substantially parallelogram-shaped cross-section have been suggested. In these assemblies the wire plies are tightly wound one upon the other in such a manner that the radially inner surface of the core is inclined relative to the horizontal so as to extend parallel to the seating surface of the bead.

Theoretically, such an annular core assembly having a substantially parallelogram-shaped cross-section and having an inner core surface inclined relative to the horizontal, may be produced from individual wires which have a corresponding parallelogram-shaped cross-section. In such a case the individual wires of the core assembly would be aligned in the extension of the ply and would be located one above the other in a vertical direction. In practice, however, it has been shown that it is difficult to produce wires of substantially parallelogram-shaped cross-section within permitted tolerances without undue expenditure.

It is already known to produce a core assembly having a substantially parallelogram-shaped cross-section by utilizing wires of rectangular cross-section. In the assembly, these wires are stepped in the vertical direction. To produce such core assemblies, the wire plies have to be supported at one end and then, for example, wound on a conical drum. This, however, causes displacement of the juxtaposed individual wires of a wire ply, so that the individual wires no longer fully mutually support one another with their adjacent surfaces. When producing such annular core assemblies, particularly during the vulcanization stage there is the danger that individual wires will skip a ply, thereby risking the cohesion of the core assembly.

The present invention seeks to provide a method of producing an annular core assembly having a substantially parallelogram-shaped cross-section in which the stability of the cross-sectional shape of a core formed of individual wires of rectangular cross-section is improved.

According to the present invention, there is provided a method of producing an annular bead core assembly having a substantially parallelogram-shaped cross-section for a pneumatic tire suitable for mounting on bevel shoulder wheel rims, the radially inner surface of the core assembly being inclined relative to the axial direction of the tire but extending parallel to the seating surface of the bead region on the rim in which wires of a substantially rectangular cross-section which are closely juxtaposed and are wound on a conical support corresponding to the bevel of the rim shoulder one upon the other to form a core assembly, wherein the wires of a wire ply are arcuately deformed prior to winding to form the core assembly, such deformation being effected in a direction substantially perpendicular to the plane of the annulus or annular ring in the finished core assembly towards the inner surface of the finished pneumatic tire, the arc having a constant radius.

The winding of the wire plies deformed in this manner on a known support leads to an annular core assembly having a substantially parallelogram-shaped cross-section, wherein the inclined inner surface of the bead core is smooth and the individual wires in the wound wire ply are juxtaposed in the same plane extending substantially axially of the bead core. Only the planes of the individual wire plies which are closely superposed are mutually radially displaced with respect to one another during the forming of the core assembly. This displacement, however, in view of the deformation forces when the tire is in use are insignificant. More important, however, is the feature that the individual wires of a ply are fully supported one upon the other by their lateral surfaces.

The deformation of the individual wires of corresponding radius, which is selected in dependence upon the inclination of the inner surface of the core facilitates the production of a core assembly having inherent stability.

Figure 2:
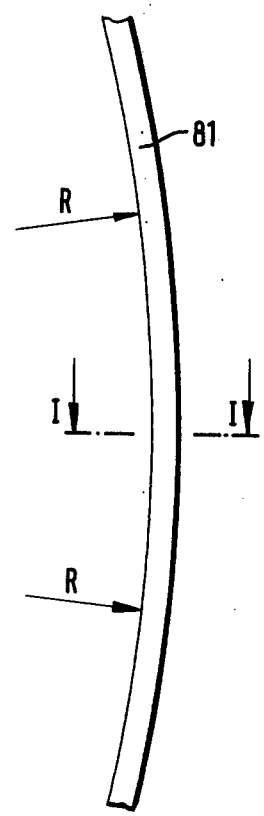
Figure 4:
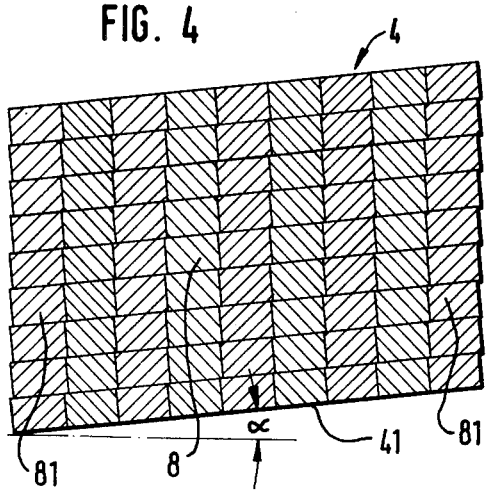
Figure 3:

The invention will be further described, by way of example, with reference to the accompanying drawings, in which:

FIG. 1 shows a section through the bead region of a pneumatic tire on a wheel rim, FIG. 2 shows an individual wire utilized for forming part of the bead core assembly, FIG. 3 is a section taken along the line I—I of FIG. 2, and FIG. 4 is an enlarged sectional view through the bead core assembly shown in FIG. 1.

In FIG. 1, there is shown a bead region 1 of a tubeless pneumatic tire, the seating surface 3 thereof abutting against an inclined shoulder portion 2 of a wheel rim. To correspond with the shape of the wheel rim, the seating surface 3 of the bead region 1 extends at an inclined angle relative to the axial direction of the tire.

In the interior of the bead region 1, a carcase ply 5 is wrapped around an annular bead core assembly 4 which is reinforced with a steel mesh.

The bead core assembly 4, best seen in FIG. 4, has a cross-section which is in the general form of a parallelogram. The assembly 4 consists of a plurality of vertically superimposed, parallel wire plies 8 extending substantially axially of the head core. Each ply 8, in turn, is formed of a plurality of laterally adjacent individual wires 81 of substantially rectangular cross-section. The radially inner surface 41 of the core assembly 4 is inclined at an angle α relative to the horizontal. This angle α corresponds to the angle of inclination of the inclined shoulder 2 of the wheel rim, against which the seating surface 3 of the bead region 1 abuts. This radially inner surface 41 of the core assembly 4 thus extends substantially parallel to the seating surface 3 and to the inclined shoulder 2 of the rim.

To produce the annular core assembly 4, the juxtaposed individual wires 81 of a wire ply 8, immediately before they are wound to form a core assembly 4 are deformed in a direction perpendicular to a plane of the annular ring or annular bead core assembly and towards the inner side of the finished tire (i.e., to the left in FIG. 1) over an arc having a constant radius; each successive superimposed ply being formed by the multiple windings of each wire of the lowermost ply upon itself. The shape of each individual wire 81 after such deformation but before winding is shown in FIG. 2. The radius selected for this arcuate deformation is thus based on the corresponding geometrical function such that, the lowermost wire ply 8 of the bead core assembly 4 when being wound onto a winding drum having an angle α, not shown, which corresponds to the angle of inclination of the shoulder 2 of the wheel rim rests smoothly against the winding drum. By correspondingly adapting the geometric values, a core assembly 4 having a cross-section as shown in FIG. 4 is produced. The individual wires 81 are closely superposed in a common plane extending substantially axially but are slightly displaced in the axial direction of the bead core from ply to ply (as shown in FIG. 4) while being individually parallel to one another and therefore give a substantially parallelogram-shaped cross-section to the core assembly 4.

I claim:

1. In a method of producing an annular bead core assembly for a pneumatic tire including a bead region having a seating surface suitable for seating on a beveled shoulder wheel rim, wherein the bead core assembly has a substantially parallelogram-shaped cross-section and a radially inner surface which, when incorporated in said tire, is inclined relative to the axial direction of the tire and extends parallel to the seating surface of said bead region, and wherein the bead core assembly comprises a plurality of wires having a substantially rectangular cross-section arranged in a plurality of juxtaposed substantially axially extending plies of the type including the step of winding the plies tightly one upon another upon a tapered support so as to produce a bead core assembly having an inclined radially inner surface which is oriented so as to extend parallel to the seating surface of the bead region of the tire into which the assembly is to be incorporated, the improvement comprising:

prior to said winding step, arcuately deforming the wires of each of said plies in a direction substantially perpendicular to a plane parallel to said annular bead core assembly and toward the inner surface of the finished pneumatic tire, said deforming step yielding wires having an arcuate shape of constant radius so as to produce plies having the general shape of the frustum of a cone, with the plies radius increasing toward the outer surface of the finished pneumatic tire.

2. In a pneumatic tire, an annular bead core assembly made by a method as recited in claim 1.

* * * * *